Sept. 18, 1962 KIYOSHI INOUE 3,054,931
ELECTRIC POWER SUPPLY APPARATUS FOR ELECTRIC DISCHARGE MACHINING
Filed March 15, 1960 3 Sheets-Sheet 1

Inventor:
Kyoshi Inoue
BY
Karl F. Ross
Agent

Inventor:
Kyoshi Inoue
BY
Karl F. Ross
Agent

United States Patent Office 3,054,931
Patented Sept. 18, 1962

3,054,931
ELECTRIC POWER SUPPLY APPARATUS FOR
ELECTRIC DISCHARGE MACHINING
Kiyoshi Inoue, No. 182, 3-chome, Tamagawayoga-machi,
Setagaya-ku, Tokyo-to, Japan
Filed Mar. 15, 1960, Ser. No. 15,218
Claims priority, application Japan Mar. 17, 1959
12 Claims. (Cl. 315—205)

This invention relates to electric power supply apparatuses for spark-discharge machining, and more particularly it relates to a new and improved power supply apparatus for electric discharge machining wherein secondary, follow-up discharging is effected after primary, main discharging, and both the machining speed and the smoothness of the surface of the work piece are improved.

The mechanism of the process of spark discharge machining is understood to be as follows: As the distance between the electrode and the work piece is reduced, the flow of electrons which travel from the electrode toward the work piece excites the liquid interposed between the electrode and workpiece, cumulatively produces a stream of electrons, and transforms it into spark discharge. Then, when the discharge path is in a completely disintegrated state, the discharge points of the electrode and the work piece evaporate because of the discharge heat and separate into gaseous phase and molten liquid phase. Meanwhile, however, an electromagnetic force (pinch effect) and a high-pressure mechanical force are created in the discharge region by the action of the discharge current. Said forces act to form a crater in the liquid phase portions and simultaneously expel the cut chips out of the discharge region. When the discharging thus ends, the said crater thereafter assumes a dish shape, and in accompaniment, a crater mount is formed about the periphery of said crater.

Since the electrode and the work piece, once their crater mount and crater have been formed, are separated by an infinitesimal gap, local short-circuit points are ordinarily created at the crater mount portion. If, as a supposition, the discharging is not completed by the time the said short-circuit points are created, the residual energy will pass through the short-circuit points in a concentrated manner and will instantaneously melt and vaporise the said points.

When this phenomenon is viewed from the point of view of metal working, it may be correctly inferred that the process comprising the initial forming of the crater mount and crater followed by the melting of the short-circuit points means that the process comprising the rough working process of forming the crater mount and crater and the finishing process of melting away the short-circuit points can be doubly achieved with a single discharge, thus multiplying the machine speed, and simplifying the process.

For the above reason, if an electric power source having a wide pulse width is used so that the discharge current will flow, unchanged, during also the short-circuiting of the crater mount, the aforesaid two kinds of processes can be made possible with a single discharge. On the other hand, however, excessive discharging energy, in general, entails to a considerable degree the possibility of converting of the spark discharging into arc discharging. In spark discharge processing, transformation into arc discharging means impossibility of further processing. Therefore, in order to maintain only spark discharging, it is necessary to select the pulse with sufficiently short width. For this reason the melting away of the short-circuit points with excessive energy is, in general, undesirable.

The use of a pulse of narrow width, as mentioned above, is sometimes accompanied by the following disadvantageous result. That is, the discharge energy is expended for only the formation of the crater mount and crater. The crater mount and crater which have, for this reason, been retained in the short-circuited condition without being melted away are caused by the pulse of the overwhelmingly excessive energy at the subsequent melting away of the short-circuit points to gain a further increase in their crater mount portion and supplementary lengthening of said short-circuit points. In such a case, both the electrode and work piece are completely short-circuited and become incapable of accomplishing machining just as in the case of arc discharging.

In discharge processing, in general, it is necessary to secure and follow up so as to maintain the gap between the electrode and the work piece constant at all times, regardless of the progress state of the machining. If, as described above, the short-circuiting occurs constantly, the prevention of short-circuiting of the electrode and the work piece will become the priority problem, and the maintenance of constant gap will become insignificant. As counter measures, two methods are conceivable: the method of temporarily stopping the supply of electric energy at the time of short-circuiting, forcibly separating the electrode and the work piece, and suppressing the development of discharge; and the method of providing the electrode servomechanism with precision, causing it to follow up positively, and thereby preventing short-circuiting.

As an application of the former of the two methods mentioned above, the present inventor has previously proposed an power supply system for discharge machining wherein the reduction of the potential difference between the electrode and the work piece at the time of short-circuiting is detected, amplified, and caused to operate to suppress the output current of the power supply system. However, this system is designed so that it operates only when short-circuiting has occurred over a substantially long period of time (several cycles). Therefore, it cannot be expected to operate with high sensitivity such as that responding to short-circuiting which occurs during one cycle. If a system which responds to short-circuiting is desired, such a system will require a complex construction and will not be economically profitable. Furthermore, short-circuiting does not occur constantly but occurs with considerable irregularity, and each discharge does not necessarily induce the short-circuiting. Therefore, the installation of an apparatus merely for the prevention of short-circuiting is decidedly not the best measure to be taken, for reasons of economy and technique.

Also, in the application of the aforesaid second method, even if the electrode servo-mechanism is provided with an extremely high degree of precision, if the expected frequency of the pulse repetitions is, say, from 500 to 1,000 kilcocycles per second, it will be necessary to effect the follow up of the electrode, also, within the range of $10^{-5}$ to $10^{-6}$ seconds, and it must be said that, because of inertia, the use of such electrode servo-mechanisms is pratically impossible.

Moreover, a special relation exists between the length of spark gap and the machining speed, and when the spark gap is of an appropriate length, a maximum machining speed is obtained, but when the spark gap is greater or smaller than said appropriate length, the machining speed is reduced. If short-circuiting is feared, and the electrode servo-mechanism is designed so that the length of spark gap will be greater than the appropriate value, the frequency of discharge repetition will decrease, and this also contributes to the lowering of the machining speed. Or, if an effort is made to maintain length of the spark gap at an appropriate value, the possibility of short-circuiting will constantly be present. In this case also, an ideal follow-up mechanism for blocking this possibility cannot be hoped for because of the influence, as mentioned above, of mechanical inertia and electrical time constant.

The above method has the disadvantage in that, even if the electrode servo-mechanism is provided with a high degree of precision in order to suppress the short-circuiting as described above, the only result is to increase the cost of construction, and the desired result cannot be attained.

In view of the foregoing points, it is an object of the present invention to provide a power supply system for electric discharge machining wherein, after a primary, main discharging, a secondary, follow-up discharging is caused to take place, and the short-circuiting points are melted away without any conversion into arc discharging.

It is another object of this invention to provide an electric discharge circuit which is suitable for the occurrence, in a short time interval, of a secondary, follow-up discharge of high energy.

It is yet another object of this invention to provide a power supply system for electric discharge machining wherein the time at which the secondary, follow-up discharge commences is controlled in accordance with the metal material to be used.

It is a further object of this invention to provide a power supply system for spark discharge machining wherein the time of flowing of the secondary, follow-up discharge current is controlled in accordance with the kind of metal material to be used.

Said objects and other objects of this invention have been achieved, in one embodiment of this invention, by the apparatus wherein an inductance capacitance circuit which resonates at a relatively high frequency is connected in parallel with a condenser for spark discharge machining (for generating pulses) which is connected across the electrode and the work piece, and thereby a secondary, follow-up discharge circuit, that is, a high-frequency discharge circuit, is formed. This secondary, high-frequency discharge circuit forms a closed circuit only when short-circuiting is caused to occur by the primary, main discharge, and supplies just enough energy to cause the melting away of the short-circuit points by the Joule heat of the high-frequency current. Consequently, the high-frequency current does not participate directly in the machining due to the spark discharge. When short-circuiting does not occur, high-frequency discharging is not effected, as a natural result, and the energy is caused to remain in its stored state until the subsequent occurrence of short-circuiting. In view of the necessity of utilizing all means to suppress the conversion into arc discharging, the apparatus is preferably designed so that the high-frequency discharge is dissipated and extinguished, if possible, within one half cycle of the frequency of repetition of the spark discharging.

The reasons for the selection of high-frequency current especially for the secondary, follow-up discharge are as follows:

The first reason is that, if the current is a high-frequency current, this current can be obtained merely by connecting an extremely simple, inductance-capacity circuit in parallel to the condenser for pulse generation without the necessity of providing a special power source for high-frequency current.

The second reason is that, with this circuit, almost no resistance exists in the circuit, and all of the energy stored in the condenser can be used for melting away the short-circuit points.

The third reason is that it is possible to establish the condition that through the resistance (resistance determined by the degree of movement of the ions) of the discharge path which is created temporarily at the time of spark discharging, the current is temporarily restrained by the inductance so that the energy in the condenser will not discharge directly, and once the short-circuit points have been created, it is possible for the first time to build up the current from zero.

The said final reason is that the use of high-frequency current is an indispensable condition for the blocking of the conversion from spark discharging into arc discharging.

In another embodiment of this invention, a C-type resonant circuit is inductively coupled further to the inductance of the secondary, high-frequency discharge circuit; and the apparatus is so arranged that the effective inductance of the circuit as a whole is reduced, and the effective capacitance is increased. Thus, in the discharge energy expressed by $\frac{1}{2} CV^2$, increase of the term C is attained, and the variation of the term $V^2$ is compensated for.

In still another embodiment of this invention, the circuit for the secondary, follow-up discharge is composed of a plurality of parallel-connected, resonant circuits, each having a slightly different resonant frequency. Then, at the time of short-circuiting, the various resonant circuits connected in parallel are simultaneously closed, and the resultant discharge current assumes the form of a geometric envelope of the forms of the discharge currents of the various resonant circuits.

In a further embodiment of this invention, the secondary, high-frequency discharge circuit is composed of a plurality of discharge circuits of different time constants so that, in accordance with the kind of metal material of the electrode and the work piece, any discharge circuit having a special time constant may be selected.

Heretofore, a method wherein a high-frequency voltage is impressed across the electrode and work piece, and a direct-circuit voltage is further superimposed thereon to accomplish a spark discharge machining, has been proposed. By this method, since a direct-current bias is imposed on the high-frequency voltage, and only a half wave of a certain polarity is caused to be impressed, the result is essentially no more than merely forming high-frequency pulses of a certain polarity. Therefore, said method differs basically from the essence of the present invention.

In another spark discharge machining apparatus which has been proposed heretofore, pulses of a certain polarity are impressed across the electrode and work piece and, simultaneously, a high-frequency voltage is superimposed thereon. Analysis of the discharge current of this apparatus indicates that the imposed high-frequency current is modulated by the discharge current of the condenser, that is, by the pulses of a certain polarity, and a high-frequency current is continuously caused to flow between the electrode and the work piece. Consequently, the high-frequency current flows not only during the time of short-circuiting, but also during the other normal period of time and contributes directly to the machining by spark discharging. On this point, also, this apparatus differs substantially from the essence of the present invention.

The unique features and advantages of this invention and the manner in which the foregoing objects may best be achieved will be more clearly understood by reference to the following detailed description of a few representative embodiments of the invention when taken in connection with the accompanying drawing, in which.

Figure 6:
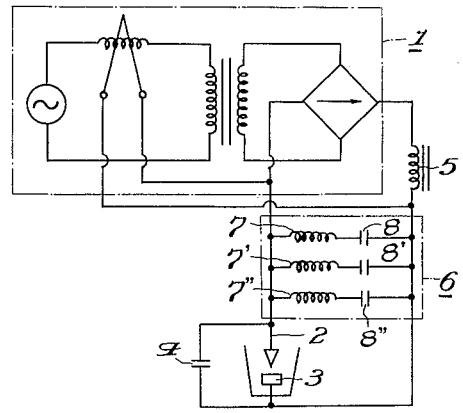
FIG. 6 is an electrical circuit diagram of a further embodiment according to the invention, wherein a plurality of secondary, high-frequency discharge circuits, each having a slightly different resonance frequency, is provided.
Figure 9:
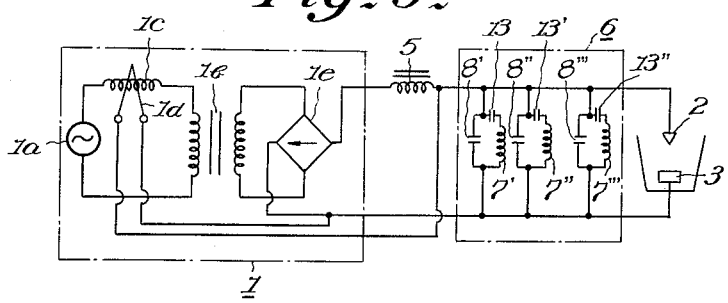
Figure 10:
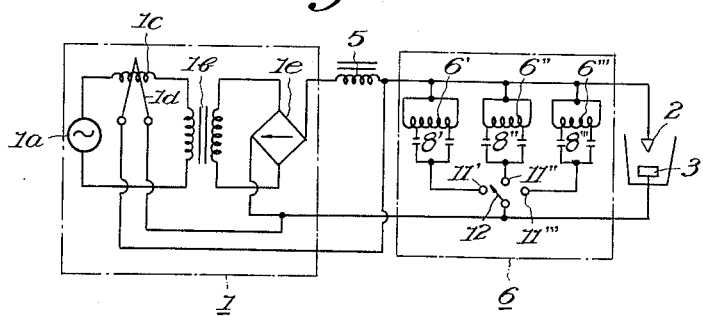

FIG. 9 is an electrical circuit diagram showing another embodiment of the secondary, follow-up discharge circuit corresponding to that of FIG. 6; and FIG. 10 is an electrical circuit diagram showing a still further embodiment of this invention, wherein a switching device for selectively connecting one of a plurality of secondary, follow-up discharge circuits of different time constants is provided.

Throughout the above illustrations, like reference numerals or symbols designate like or equivalent circuit elements.

Figure 1:
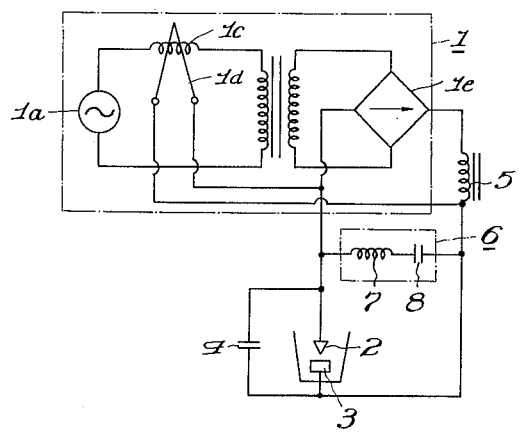
FIG. 1 is an electrical circuit diagram showing one embodiment of this invention, wherein a series-resonant-type, secondary, follow-up discharge circuit is provided.
Figure 2:
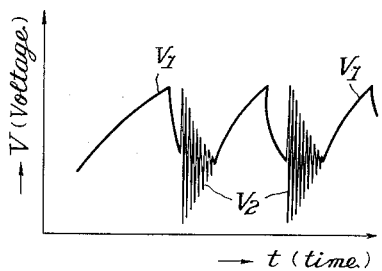
FIG. 2 is a graph for describing the primary, main discharge, voltage wave form and the secondary, follow-up discharge, voltage wave form occurring in an embodiment of the apparatus of the invention.

Referring to FIG. 1, the machining electric power supply source 1 is used for impressing electric pulse voltage across the discharge gap between an electrode 2 and a work piece 3 which is used as another electrode. In the design of said power source 1 consideration has been given to the providing of control so that, at the time of short-circuiting of said gap, the output voltage of said power source will be lowered abruptly. A condenser 4 for producing electric pulses is charged by the output of said power source 1 through an inductor 5 acting as a filter. The power source 1 is composed of an alternating-current source 1a, a transformer 1b, a saturable reactor 1c having a direct-current exciting coil 1d, and a rectifier device 1e, said exciting coil 1d being connected to the output side of said rectifier device. Accordingly, when the discharge gap 2 between the electrode 2 and work piece 3 is short-circuited, the current of the exciting coil 1d is lowered abruptly, whereby the impedance of the reactor 1c becomes large and the output voltage of the power source 1 is lowered abruptly. Thus, it is a unique feature of the present invention that a series resonant circuit 6 is connected across the electrode 2 and the work piece 3 and, at the same time, in parallel to a condenser 4 for producing pulses. Said series resonant circuit 6 is composed of an inductor 7 and a condenser 8. The capacitance of the condenser 8 is indicated by experimental results to be suitable when it is of the order of one-tenth of the capacitance of the condenser 4 for producing pulses. The wave forms, or wave profiles, of the primary, main discharge and secondary, follow-up discharge voltages at the time of discharge machining may be represented graphically as shown in FIG. 2. As indicated in this diagram, the voltage of pulse $V_1$ produced from the condenser 4 achieves the metal machining due to spark discharging under a certain period of cycle. If, as a supposition, short-circuiting occurs in each cycle, the voltage of the secondary, follow-up discharge pulse $V_2$ will be generated as shown in FIG. 2, and, only when the voltage of the pulse $V_1$ reaches a minimum value or a value in the vicinity thereof, the pulse $V_2$ appears suddenly.

Figure 3:
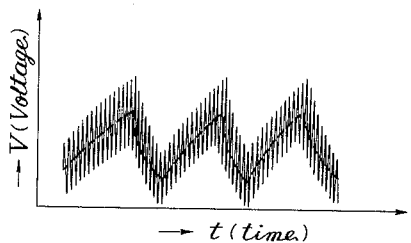
FIG. 3 is a graph showing the discharge voltage wave form in the case of an apparatus proposed heretofore, wherein high-frequency waves are superimposed on pulses.

In the case of apparatus proposed heretofore wherein a high-frequency electric power source is connected in parallel with a condenser for producing pulses, the voltage wave forms differ from those of FIG. 2 and are as shown in FIG. 3. As is apparent from this diagram, the high-frequency electric voltage is constantly superimposed on the pulse voltage, and a constant, high-frequency energy is imparted continuously between the electrode and the work piece during the time of machining by spark discharging and also during the time of short-circuiting. Consequently, the spark discharging is constantly accompanied by the possibility of its conversion into an arc discharging.

In contrast, in the case of the apparatus of the present invention, the high-frequency electric current due to the secondary, follow-up discharge is zero at the time of beginning of spark discharging and builds up from zero only after circuit closure due to short-circuiting, consequently, contributing in no way to the spark discharge machining. Accordingly, it is possible to prevent, completely, the conversion into an arc discharging.

Moreover, in the case of conventional, discharge machining apparatus, wide gaps between the electrode and work piece are used out of fear of short-circuiting, even at the sacrifice of machining speed. In contrast, in the case of the apparatus of the present invention, since it is always possible to melt away the short-circuit points which create possibilities of short-circuiting, it is possible to place the electrode and the work piece as closely as possible to each other, and it is possible to multiply the machining speed and, at the same time, to improve the degree of smoothness of the machined surface.

Figure 4:
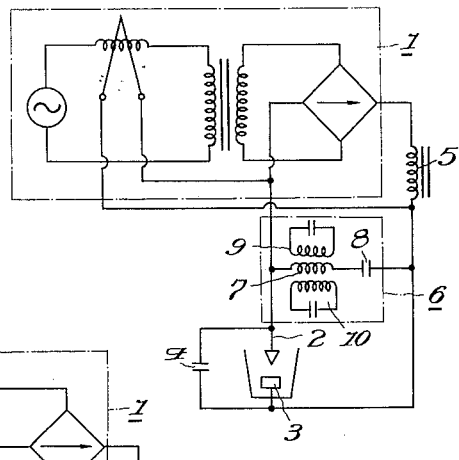
FIG. 4 is an electrical circuit diagram of another embodiment of the secondary, high-frequency discharge circuit according to the invention.
Figure 5:
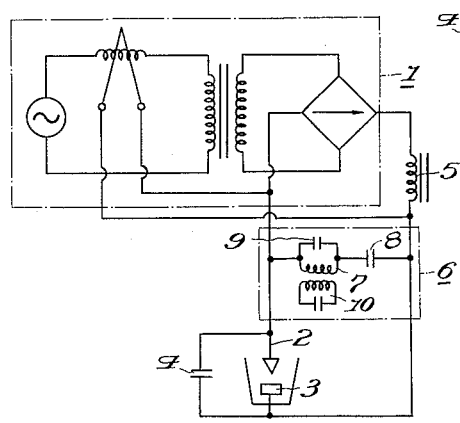
FIG. 5 is an electrical circuit diagram of a modification of the circuit shown in FIG. 4.

The secondary, follow-up discharge circuit need not be limited to a series resonant circuit; it is possible to use a C-type resonant circuit. The use of said C-type resonant circuit is illustrated in FIGS. 4 and 5, wherein parallel resonant circuits 9 and 10 are connected to an inductor 7 of a series resonant circuit.

Moreover, the secondary, follow-up discharge need not always be a high-frequency electric current. As long as the short-circuit points are melted away by the Joule heat, the use of pulses with narrow widths may also be recommended. However, it is not the best practice to supply this pulse from another electric power source because, although it is possible to provide, especially, an electric power source which will pass a pulse for secondary, follow-up discharge for every interval of the pulse for the main discharge, this will not only complicate the apparatus needlessly, but also create problems in cost. Furthermore, the providing of an electric power source for selectively producing pulses only at the time of short-circuiting is beyond consideration.

Figure 7:
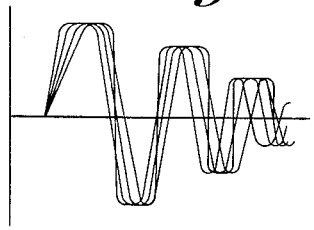
FIG. 7 is a graph for describing the secondary, follow-up discharge voltage of the apparatus shown in FIG. 6.
Figure 8:
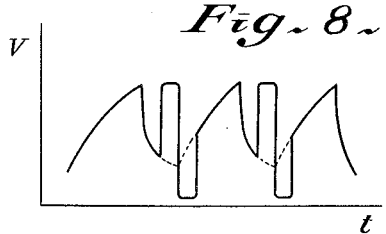
FIG. 8 is a graph showing the primary, main discharge and secondary, follow-up discharge voltage wave forms of the apparatus of FIG. 6.

In view of the above points, the present invention further proposes an electric power source for discharge machining provided with a plurality of high-frequency resonant circuits, each with a slightly different resonant frequency. One embodiment thereof is illustrated in FIG. 6, wherein the secondary, follow-up discharge circuit 6 comprises a series resonant circuit composed of a reactor 7′ and a condenser 8′, series resonant circuit composed of a reactor 7″ and a condenser 8″, and a series resonant circuit composed of a reactor 7‴ and a condenser 8‴, said resonant circuits being connected in parallel, and having resonance frequencies differing slightly from one another. The wave forms of the high-frequency discharge currents due to these circuits at the time of short-circuiting are as shown in FIG. 7, and the envelope curve of said forms is a damped oscillation of a rectangular wave with positive and negative polarity. If the apparatus is designed so that the damping is effected abruptly, and the following pulse for spark discharge machining is impressed on the machine points at the time when the said envelope curve converts to the negative side, the machining electric voltage will be approximately as shown in FIG. 8. Thus, it is possible to produce pulses selectively at the time of short-circuiting with the use of an extremely simple circuit, and, moreover, it is possible to make said pulses have greater energy than that of any other wave form, that is, to make pulses of rectangular wave form.

Furthermore, the composing of the secondary, follow-up discharge circuit with the use of a plurality of resonant circuits has the following advantages. Even if the capacity of the condenser 8 is increased in an effort to obtain a high energy from a single, high-frequency discharge circuit as shown in FIG. 1, the discharge current cannot increase in proportion to the capacitance, and, in general, a linear relation does not exist between said discharge current and capacitance. Therefore, if the capacity of the condenser 8 is divided, and distributed among the parallel circuits 7'8', 7"8", . . . 7'''8''' as shown in FIG. 6, the discharge current will increase approximately linearly in accordance with the number of parallel circuits, and results which could never be expected from a single, high-frequency discharge circuit will be obtainable.

For this follow-up discharge circuit, the same effect can be obtained, of course, by connecting in parallel a plurality of parallel resonant circuits 7'8', 7"8", . . . 7'''8''' as shown in FIG. 9, in which condensers 13, 13' and 13'' are provided for suppressing direct current.

It has been determined from experimental results that, if the above-mentioned, secondary, follow-up discharge energy, instead of being supplied uniformly in an indiscriminate manner to any work to be machined, is varied according to the kind of metal of the work, good results will be obtainable. More specifically, even if the short-circuit points are to be melted away, there are many metals requiring a great variety of form of follow-up discharge, such as, depending on the kind of metal, those for which good results can be obtained by suitably retarding the instant of beginning of discharging of the secondary, follow-up discharge current; those requiring a considerably long period of current flow; or those for which good results are obtained by advancing, as much as possible, the instant of beginning of discharging and, at the same time, holding the current flow period to a short time. For example, in the case wherein the work to be machined is copper, good results are obtained by causing the secondary, follow-up discharge to take place after the elapse of a short time subsequent to the discharge of the pulse for spark discharge machining; or, in the case of extremely hard metals, it is preferable that the secondary, follow-up discharge take place immediately after the completion of the spark discharge.

In view of the above-described points, the present invention provides a power-supply apparatus for discharge machining which is, further, so composed as to enable the selection of the secondary, follow-up discharge circuit of the optimum time constant, in each case for the metal material of the work piece and the electrode.

Referring to FIG. 10, the secondary, follow-up discharge circuit 6 is composed of high-frequency, resonant circuits 6', 6'' and 6''', each having a different time constant. One end of each of these circuits is connected to the electrode 2, and the other end thereof is connected to switch taps 11', 11'' and 11'''. The said switch taps are provided with a change-over switch 12, which enables adjustment, at will, in accordance with the kind of metal used. Thus, each circuit is selectively connected to the condensers 8', 8'' or 8''' for producing pulses, and the aforesaid object is achieved.

It is evident that, instead of the use of the above-described switching mechanism, the use of variable inductors or variable condensers in the high-frequency, resonant circuits would enable the accomplishment of the same object.

Since it is obvious that many changes and modifications can be made in the above-described details without departing from the nature and spirit of the invention, it is to be understood that the invention is not to be limited to the details described herein and to the embodiments illustrated in the accompanying drawing except as set forth in the appended claims.

What I claim is:

1. In apparatus for electrical discharge machining the combination, with a workpiece constituting a first electrode, of a second electrode spaced from said first electrode, electrical-energy-storage means connected across said electrodes for periodic electrical discharge through the gap therebetween at a predetermined cadence, a source of electric current connected to said electrical-energy-storage means, and a resonant network connected across said electrodes operable upon a substantial drop in the resistance between said electrodes for impressing across said gap an alternating electric current of limited duration and of a frequency substantially greater than said cadence.

2. The combination according to claim 1 wherein said resonant network includes a capacitive and an inductive series branch in combination with a tank circuit coupled with one of said branches.

3. The combination according to claim 2 wherein said tank circuit is electromagnetically coupled with said inductive branch.

4. The combination according to claim 1 wherein said resonant network includes a capacitive and an inductive series branch in combination with a plurality of tank circuits electromagnetically coupled with said inductive branch.

5. In apparatus for electrical discharge machining the combination, with a workpiece constituting a first electrode, of a second electrode spaced from said first electrode, capacitor means connected across said electrodes for periodic electrical discharge through the gap therebetween at a predetermined cadence, a source of direct electric current connected to said capacitor means, and a series-resonant network connected across said electrodes and constituting a series circuit with said gap upon a substantial drop in the resistance between said electrodes for impressing across said gap an alternating electric current of limited duration and of a frequency substantially greater than said cadence.

6. In apparatus for electrical discharge machining the combination, with a workpiece constituting a first electrode, of a second electrode spaced from said first electrode, capacitor means connected across said electrodes for periodic electrical discharge through the gap therebetween at a predetermined cadence, a source of direct electric current connected to said capacitor means, and a plurality of series-resonant networks of different resonance frequencies connected across said electrodes and constituting respective series circuits with said gap upon a substantial drop in the resistance between said electrodes for impressing across said gap an alternating electric current of limited duration and of a frequency substantially greater than said cadence.

7. The combination according to claim 6 wherein said networks are connected in parallel with one another.

8. The combination according to claim 6 wherein each of said networks has an inductive branch and a capacitive branch, the reactance of at least one of said branches being adjustable.

9. The combination according to claim 6 wherein said capacitor means comprises a plurality of storage condensers respectively connected across said series-resonant circuits.

10. In apparatus for electrical discharge machining the combination, with a workpiece constituting a first electrode, of a second electrode spaced from said first electrode, capacitor means connected across said electrodes for periodic electrical discharge through the gap therebetween at a predetermined cadence, a source of direct electric current connected to said capacitor means, and a plurality of series-resonant networks of different resonance frequencies selectively connectable across said electrodes and constituting respective series circuits with said gap upon a substantial drop in the resistance between said electrodes for impressing across said gap an alternating electric current of limited duration and of a frequency substantially greater than said cadence.

11. In apparatus for electrical discharge machining the combination, with a workpiece constituting a first electrode, of a second electrode spaced from said first electrode, electrical-energy-storage means connected across said electrodes for periodic electrical discharge through the gap therebetween, a source of direct electric current connected to said electrical energy storage means; said source including rectifier means, a source of alternating current connected to said rectifier means and a saturable reactor having its alternating-current winding connected in series with said source of alternating current and said rectifier means, said saturable reactor having a control winding connected across said electrodes whereby said reactor is desaturated upon a short-circuiting of said electrodes, and a resonant network connected across said electrodes operable upon a substantial drop in the resistance between said electrodes for impressing across said gap an alternating electric current of limited duration and of a frequency substantially greater than the cadence of discharge of said electrical-energy-storage means.

12. In apparatus for electrical discharge machining the combination, with a workpiece constituting a first electrode, of a second electrode spaced from said first electrode, capacitor means connected across said electrodes for periodic electrical discharge through the gap therebetween at a predetermined cadence, a source of direct electric current connected to said capacitor means; said source including rectifier means, a source of alternating current connected to said rectifier means and a saturable reactor having its alternating-current winding connected in series with said source of alternating current and said rectifier means, said saturable reactor having a control winding connected across said electrodes whereby said reactor is desaturated upon a short-circuiting of said electrodes, and a plurality of series-resonant networks of different resonance frequencies selectively connectable across said electrodes and constituting respective series circuits with said gap upon a substantial drop in the resistance between said electrodes for impressing across said gap an alternating electric current of limited duration and of a frequency substantially greater than said cadence.

References Cited in the file of this patent

UNITED STATES PATENTS

| | | |
|---|---|---|
| 2,365,611 | White | Dec. 19, 1944 |
| 2,757,318 | Noel et al. | July 31, 1956 |
| 2,895,080 | Branker | July 14, 1959 |

FOREIGN PATENTS

| | | |
|---|---|---|
| 782,443 | Great Britain | Sept. 4, 1957 |